(12) United States Patent
Mahoney et al.

(10) Patent No.: US 6,995,953 B2
(45) Date of Patent: Feb. 7, 2006

(54) HEAD GIMBAL ASSEMBLY HIGH PERFORMANCE SHOCK LIMITER

(75) Inventors: James Roger Mahoney, Stewart, MN (US); Sandeepan Bhattacharya, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 168 days.

(21) Appl. No.: 10/407,363

(22) Filed: Apr. 4, 2003

(65) Prior Publication Data

US 2004/0070883 A1 Apr. 15, 2004

Related U.S. Application Data

(60) Provisional application No. 60/417,236, filed on Oct. 9, 2002.

(51) Int. Cl.
*G11B 21/16* (2006.01)

(52) U.S. Cl. .................................................. 360/245.7
(58) Field of Classification Search ....... 360/245–245.9
See application file for complete search history.

(56) References Cited

U.S. PATENT DOCUMENTS

| | | | |
|---|---|---|---|
| 5,079,659 A | | 1/1992 | Hagen |
| 5,790,347 A | * | 8/1998 | Girard .......................... 360/245 |
| 5,838,517 A | * | 11/1998 | Frater et al. ............... 360/245.7 |
| 5,877,920 A | * | 3/1999 | Resh ........................ 360/245.7 |
| 6,018,439 A | | 1/2000 | Forbord et al. |
| 6,021,022 A | | 2/2000 | Himes et al. |
| 6,157,520 A | * | 12/2000 | Mangold et al. ............. 360/255 |
| 6,172,853 B1 | | 1/2001 | Davis et al. .............. 360/245.7 |
| 6,191,915 B1 | | 2/2001 | Takagi et al. |
| 6,243,235 B1 | * | 6/2001 | Fu et al. .................... 360/245.7 |
| 6,266,212 B1 | | 7/2001 | Coon ........................ 360/234.5 |
| 6,351,350 B1 | | 2/2002 | Symons et al. ........... 360/244.9 |
| 6,373,664 B1 | | 4/2002 | Coon et al. ............... 360/245.7 |
| 6,377,425 B1 | | 4/2002 | Khan ........................ 360/245.9 |
| 6,388,843 B1 | | 5/2002 | Takagi et al. ............. 360/245.7 |
| 6,417,996 B1 | | 7/2002 | Budde ...................... 360/245.7 |
| 6,424,498 B1 | | 7/2002 | Patterson et al. ......... 360/245.7 |
| 6,445,546 B1 | * | 9/2002 | Coon ........................ 360/245.7 |
| 6,587,309 B2 | * | 7/2003 | Nojima ..................... 360/245.7 |
| 2001/0017748 A1 | | 8/2001 | Resh et al. ............... 360/244.9 |
| 2001/0030837 A1 | | 10/2001 | Murphy et al. ........... 360/244.9 |
| 2002/0012201 A1 | | 1/2002 | Berg et al. ................ 360/244.2 |
| 2002/0027747 A1 | | 3/2002 | Budde ...................... 360/245.7 |
| 2002/0075602 A1 | | 6/2002 | Mangold et al. .......... 360/245.7 |

OTHER PUBLICATIONS

"Design, Fabrication, and Testing of Silicon Microgimbals for Super–Compact Rigid Disk Drives", *Journal of Microelectricmechanical Systems*, vol. 4, No. 1, Mar. 1995.

* cited by examiner

*Primary Examiner*—Allen Cao
(74) *Attorney, Agent, or Firm*—Kinney & Lange, P.A.

(57) ABSTRACT

A head gimbal assembly has a gimbal with a limiter formed from a sheet prior to attachment to the load beam structure. The limiter has a pair of flange extensions, each flange extension having an arm extension. The flange extensions and the arm extension are bent around a tip of the load beam to interleave the limiter around the load beam. The arm extensions have a narrower width than a width of the flange extensions, providing room for adjustment to the pitch and roll attitude of the system after assembly.

27 Claims, 6 Drawing Sheets

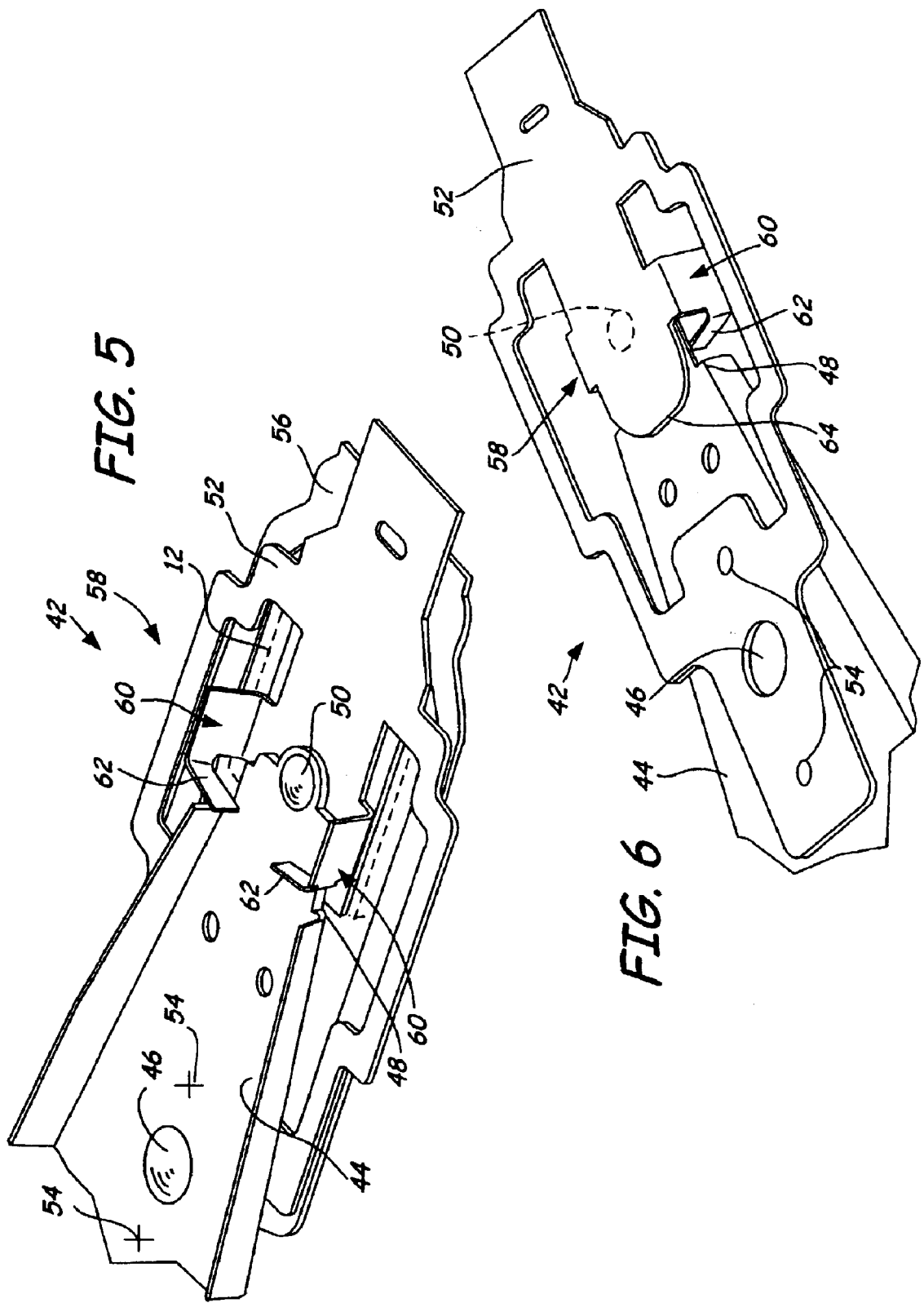

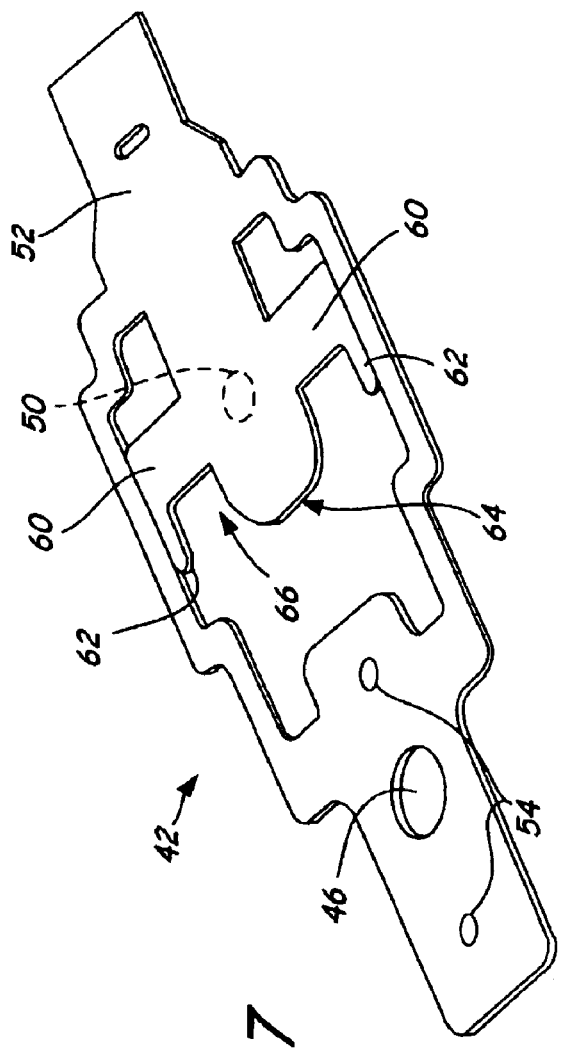
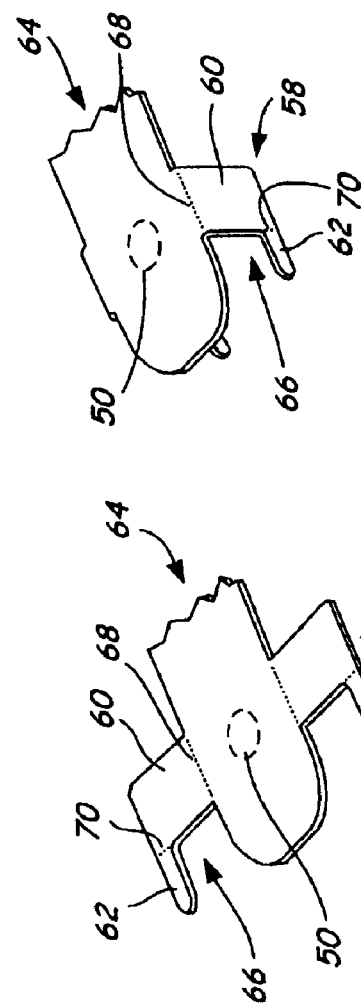
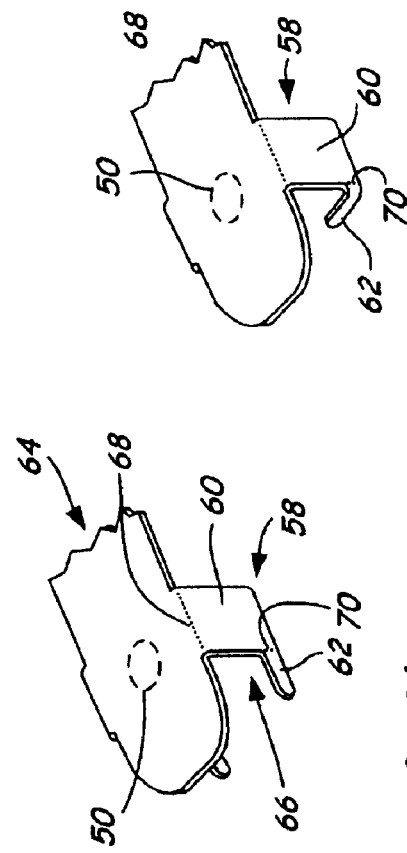
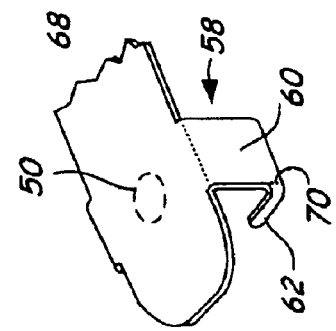

HEAD GIMBAL ASSEMBLY HIGH PERFORMANCE SHOCK LIMITER

CROSS-REFERENCE TO RELATED APPLICATION(S)

This application claims priority from provisional application Ser. No. 60/417,236, filed on Oct. 9, 2002, and entitled "HEAD GIMBAL ASSEMBLY HIGH PERFORMANCE SHOCK LIMITER".

BACKGROUND OF THE INVENTION

The present invention relates generally to a disc drive assembly. In particular, the present application relates to a shock limiting suspension for a magnetic read-write head in a disc drive assembly.

Disc drives of systems are known which read data from a disc surface during operation of a disc drive. Typically, such disc drive systems include magnetic disc drives and optical disc drive systems. Generally, discs are rotated for operation of the disc drive via a spindle motor to position for reading data from or writing data to selected portions or tracks on the disc surface.

The read-write head generally includes an air bearing surface, which floats or flies above the disc surface in a known manner. Generally, the slider flies with a positive pitch angle at which the leading edge of the slider flies at a greater distance from the disc surface than the trailing edge via a suspension assembly, which includes a load beam and a gimbal. The slider is coupled to the load beam via a gimbal. The load beam applies a load force to the slider via a dimple. The dimple defines an access about which the slider pitches and rolls via the gimbal. The slider is preferably resilient in the pitch and roll direction to enable the slider to follow the topography of the disc based on the hydrodynamic lifting force caused by the disc rotation.

Generally, the gimbal permits the air bearing slider to pitch and roll as the slider flies above the disc surface. It is important to maintain the proximity of the slider relative to the disc surface during operation. In a typical disc drive, a magnetic transducer element is carried on the slider to write data to the disc surface.

Depending on the mass and stiffness of the suspension assembly, including the gimbal and the load beam, external vibration may excite the load beam and gimbal at a resonant frequency. Thus, the input motion or external vibration may be amplified substantially, causing unstable misalignment of the slider relative to the disc surface. Such misalignment may result in data loss and/or damage to the disc surface.

External vibration or excitation of the suspension assembly and slider may introduce varied motion of the slider and suspension assembly. Depending on the nature and frequency of the excitation force, the slider and suspension assembly may cause torsional mode motion, sway mode vibration and bending mode resonance. Torsional mode motion relates to rotation or twisting of the suspension assembly about an in-plane axes. Bending mode resonance essentially relates to up-down motion of the suspension assembly relative to the disc surface. Sway mode vibration relates to in-plane lateral motion and twisting. It is very important to limit resonance motion to assure stable fly characteristics for the slider. In particular, it is important to control the torsion and sway mode resonance, since they produce a transverse motion of the slider, causing head misalignment with respect to the data tracks of the disc surface.

Generally, the resonance frequency of the suspension assembly is related to the stiffness or elasticity and the mass of the suspension system. Thus, it is desirable to design a suspension system, which limits the effect of sway mode and torsion mode resonance in the operating frequencies of the disc drive, while providing a suspension design which permits the slider to pitch and roll relative to the dimple.

Deflection limiters are beneficial for multiple reasons. During a shock event, such as dropping the disc drive or the lap top computer, the mass of the head can pull the gimbal away from the load beam if there is not deflection limiter. The shock event can induce stress in the gimbal. This stress may be enough to bend the gimbal and result in dimple separation and/or changes to the pitch and roll static angle (attitude) of the gimbal. A deflection limiter is designed to prevent separation of the gimbal by insuring that the deflection is not large enough to cause the stress to reach the gimbal's yield point, which could cause gimbal separation resulting in disc drive failure.

Such deflection limiters structures are broadly known. Generally, they are designed to either prevent excessive movement during shock events such as the jarring or dropping of a computer, or to prevent non-operational damage to the suspension-gimbal structure.

Generally, there are two ways in which to introduce a shock limiter to a disc drive structure: features are presented on the load beam to engage the gimbal and limit the excessive motion during shock events, or features are presented on the gimbal to engage the load beam to prevent excessive motion during a shock event.

In the field of suspension technology for magnetic disc drives, stainless steel is typically used as the support structure for the slider. A typical configuration consists of an etched gimbal ring, which is welded to the suspension load beam. A circuit is routed over or adjacent to the steel gimbal to provide an electrical connection to the slider. The assembly is cantilevered from the load beam and pre-loaded against a dimple, which protrudes from the load beam. For robustness, a hook is formed in the steel gimbal sheet and is interleaved through an opening in the load beam. This feature serves as the "limiter".

This type of limiter is relatively simple to incorporate into a Load/Unload mobile drive application due to the available material around the load point and slider necessary to support the lift tab feature at the distal end. However, incorporating such a limiter into a non-Load/Unload or a contact start stop (CSS) design becomes difficult because of a number of factors: material availability, resonance requirements, tolerance "stack-up", slider bonding area, clearance for assembly processes, attitude adjustability, and robustness.

In non-Load/Unload and CSS designs, there is insufficient available material to incorporate the limiter engagement feature. Specifically, the load beam tip is narrow and the load point is typically coincident with the end of the beam, leaving little extra material from which to form the limiter engagement feature.

Resonance requirements of the head gimbal assembly dictate that the structural mass at the load arm tip must be minimized. Specifically, it is desirable to minimize the mass added to the structure. If mass must be added, it is desirable to keep the added mass as close as possible to the center line or axis of the structure in order to maintain the equilibrium or balance of the structural mass. By minimizing the mass and by keeping the added mass near the center line, the overall resonance performance of the structure is enhanced.

With respect to tolerance "stack up", incorporation of a limiting feature internal to the load beam (such as the interleaved hook through an opening in the load beam) requires clearance for clamping, forming, and welding, and other steps of the fabrication and assembly processes.

Additionally, when the limiter is interleaved through an opening in the load beam, material must be removed from the load beam to provide the opening. This, in turn, impacts the resonance performance of the system as a whole. Additionally, removal of material from the gimbal/tongue area to provide the limiter structure necessarily reduces the size of the bonding area available for attaching the slider to the gimbal.

Finally, the various limiters in the prior art typically impose structural limitations on the disc drive structure, such as allowing clearance for gold ball bonding processes and limiting adjustability of the pitch and roll static attitude during assembly.

Therefore, it is desirable to have a robust shock limiter that maintains the narrow profile of the load beam and that adds little material in a balanced arrangement close to the center axis (center of mass) of the suspension. Moreover, it is desirable that the gimbal interleave with the load beam without requiring an opening in the load beam and without removing much material from the gimbal in the bonding area. Finally, it is desirable to have a robust shock limiter that maintains pitch and roll static attitude adjustability during assembly.

BRIEF SUMMARY OF THE INVENTION

A shock limiter for use with in a disc drive having rotatable discs is formed from a unitary piece of material integrally with the gimbal. The limiter has a pair of flange extensions arranged symmetrically relative to a longitudinal axis of the gimbal. Each flange extension has an arm extension, which can be interleaved around the attachment tip to limit movement of the gimbal relative to the load beam in a shock event.

BRIEF DESCRIPTION OF THE DRAWINGS

FIG. 5 is a top plan view of an interleaved shock limiter according to the present invention.

FIG. 6 is a bottom plan view of the interleaved shock limiter of the present invention.

FIG. 7 is a bottom plan view of the shock limiter prior to assembly.

FIGS. 8a–8c are bottom plan views of the limiter engagement element shown prior to bending, after the first bend is made and after the second bend is made, respectively.

DETAILED DESCRIPTION

Figure 1:
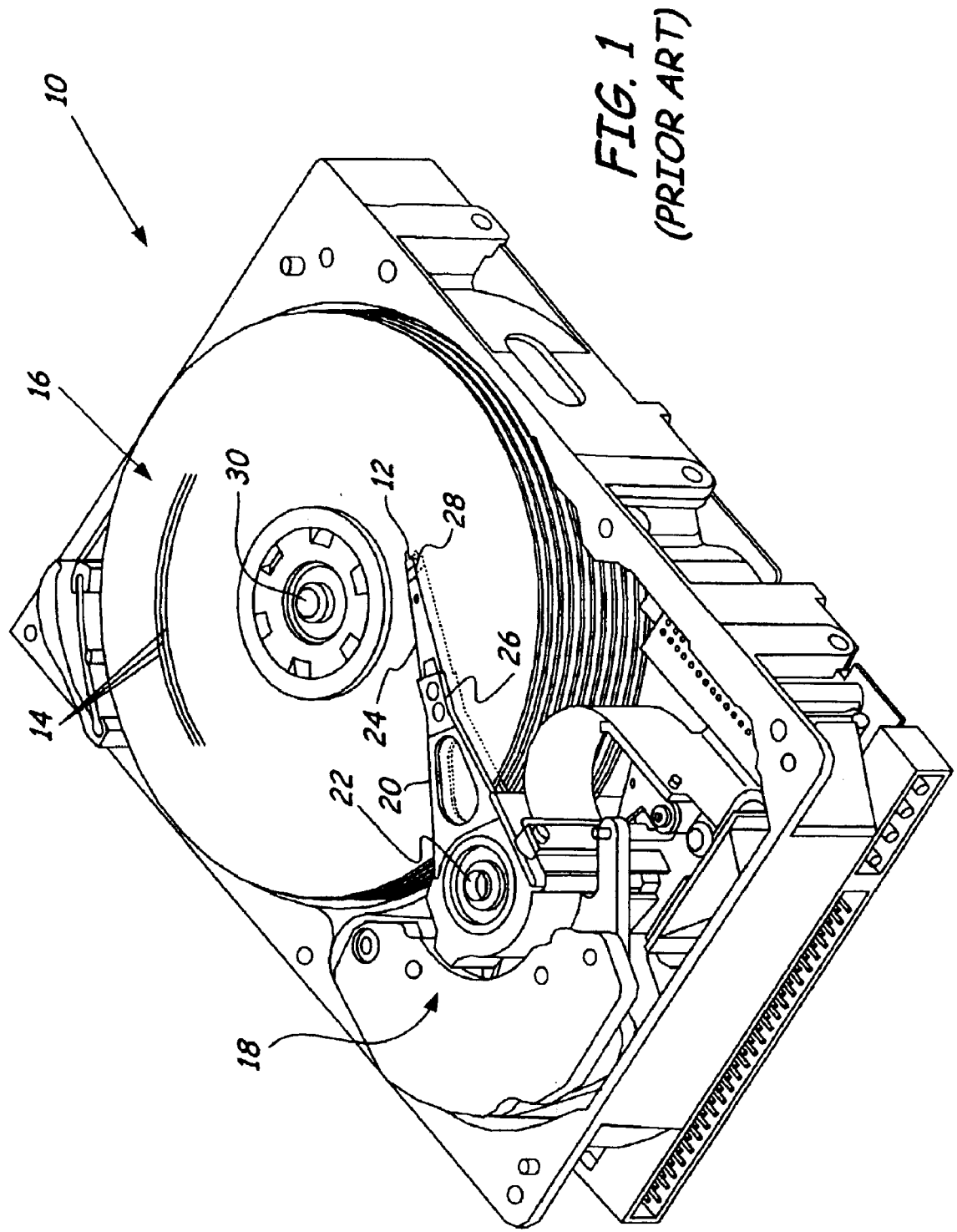
FIG. 1 is a perspective view of a disc drive including an actuator assembly and a load beam of the prior art.

FIG. 1 is a perspective view of a prior art disc drive 10 including an actuation assembly for positioning a slider 12 over a track 14 of a disc 16. Disc drive 10 includes a voice coil motor (VCM) 18 arranged to rotate an actuator arm 20 on a spindle around an axis 22. A load beam 24 is connected to actuator arm 20 at a head mounting block 26. A gimbal 28 is connected to an end of load beam 24 and slider 12 is attached to gimbal 28. Slider 12 carries a transducing head (not shown in FIG. 1) for reading and/or writing data on concentric tracks 14 of disc 16. Disc 16 rotates around an axis 30, producing a hydrodynamic layer of air that keeps the slider 12 aloft a small distance above the surface of disc 16. FIG. 1 shows a high capacity disc driving having multiple rotating discs 16. The disc drive has an upper and lower actuation assembly, with the lower actuation assembly being shown in phantom.

Figure 2:
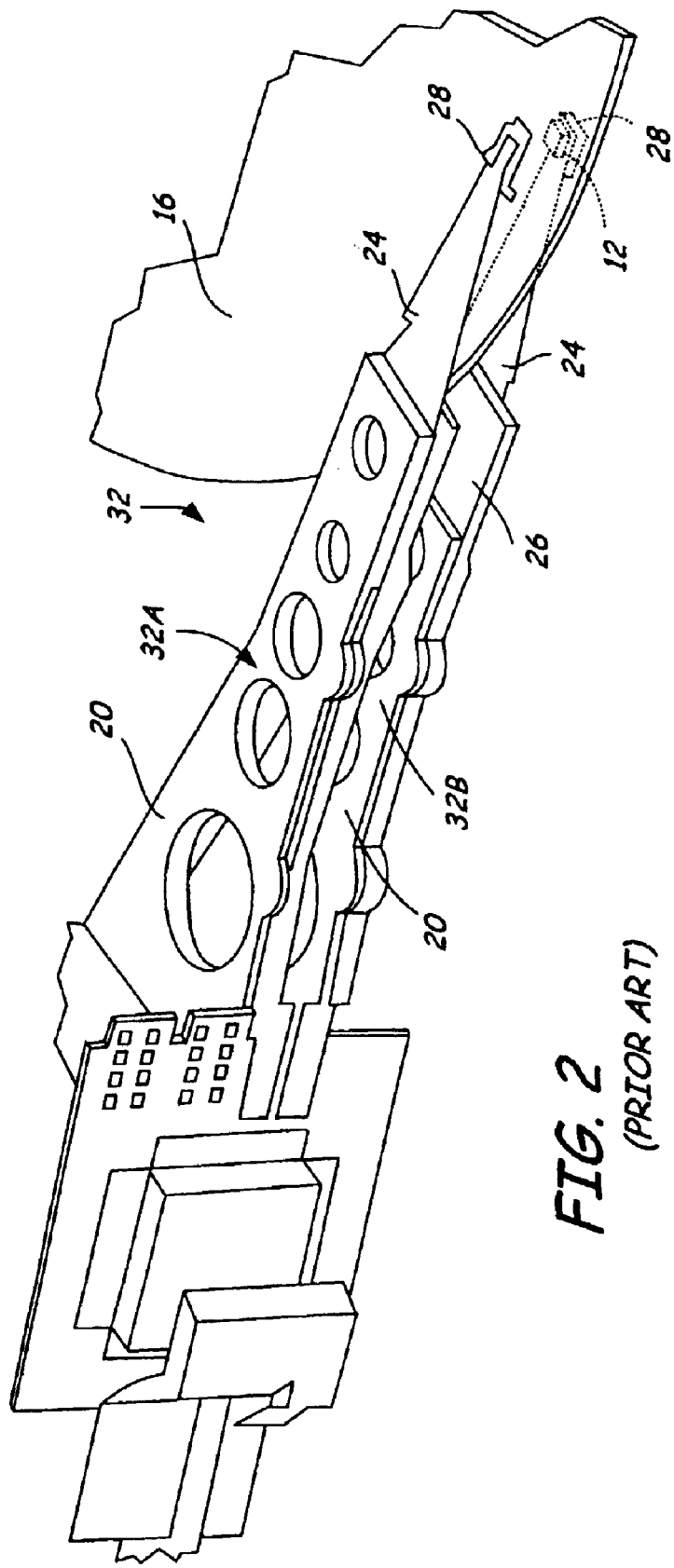
FIG. 2 is a perspective view of an actuation assembly in the prior art.

FIG. 2 is a perspective view of a prior art actuation assembly 32 for positioning slider 12 over track 14 of disc 16. Actuation assembly 32 includes an upper assembly 32A and a lower assembly 32B that are identical. Both the upper assembly 32A and the lower assembly 32B have actuator arm 20 with load beam 24 connected to the actuator arm 20 at head mounting block 26. Gimbal 28 is connected to an end of load beam 24, and slider 12 is attached to gimbal 28. Slider 12 carried by upper assembly 32A reads and writes data from an upper surface of disc 16. Slider 12 located on lower assembly 32B reads and writes data from the lower surface of disc 16.

Figure 3:
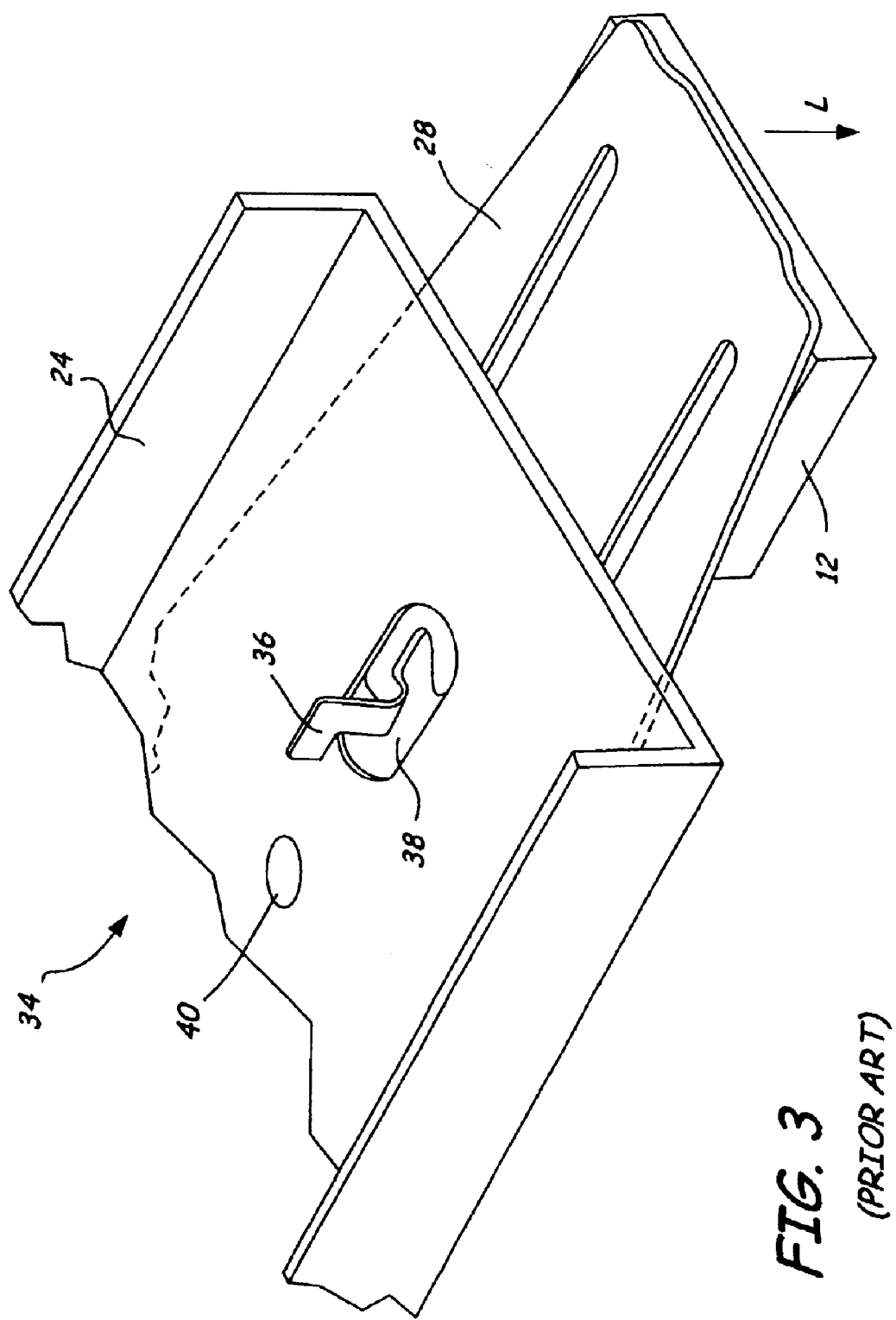
FIG. 3 is a perspective view of a prior art shock limiter positioned through an opening in the load beam.

FIG. 3 is a magnified perspective view of a prior art head gimbal assembly 34 with a shock limiter 36 positioned through an opening 38 in the load beam 24. The location of the weld point 40 for attaching the gimbal 28 to the load beam 24 is shown in shadow. This prior art shock limiter 36 is positioned well behind the slider 12, such that the inertial load on the gimbal 28 is acting away from the shock limiter 36 and from the weld point 40. During a shock event particularly in the direction indicated by arrow (L), this shock limiter 36 may fail to limit the movement of the gimbal 28 and slider 12. Specifically, the gimbal 28 is likely to bend due to the load disposed far away from the limiter, and the shock limiter 36 is likely to pull out of the opening 38, thereby failing to limit the bending motion of the gimbal 28 and head 12.

Figure 4:
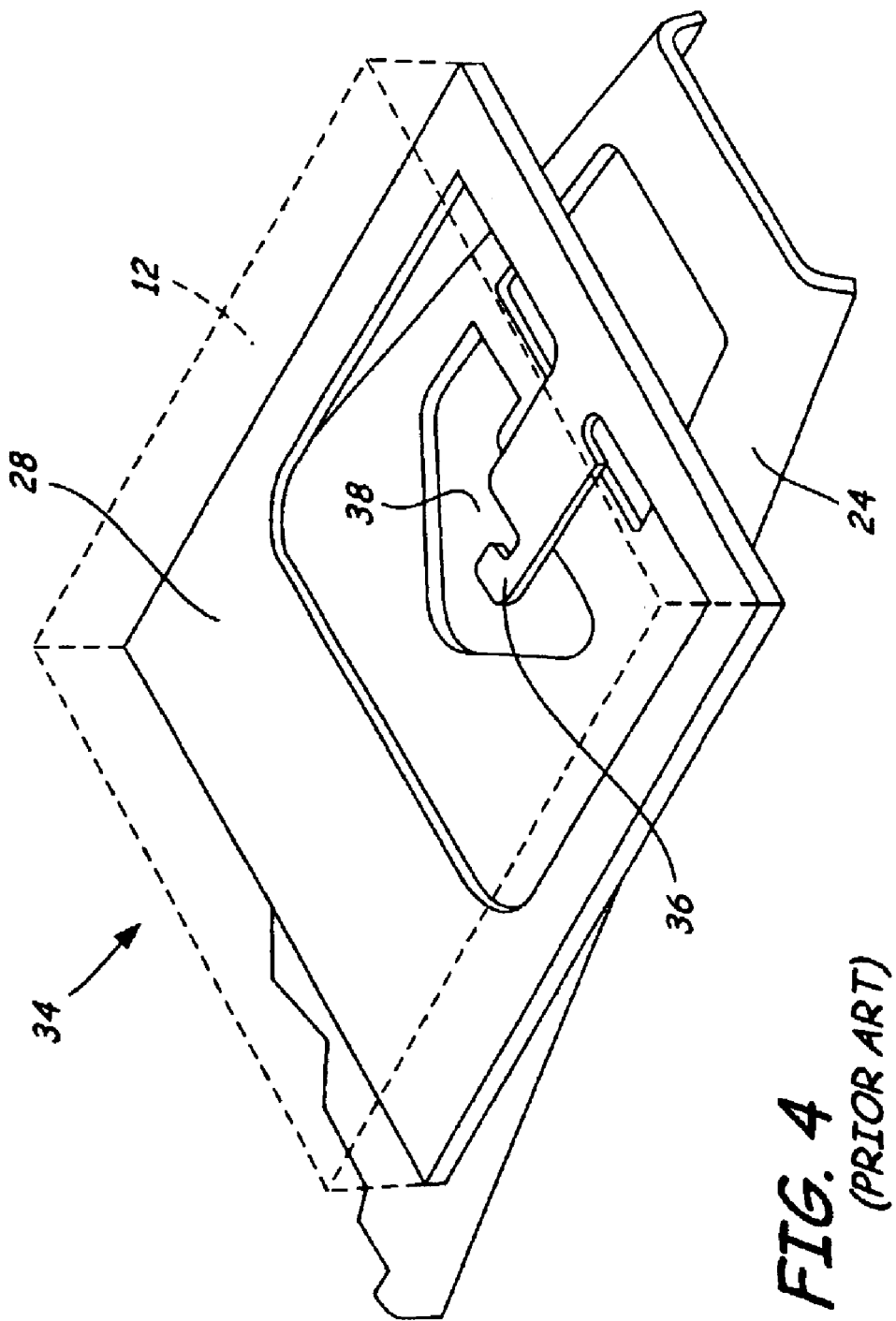
FIG. 4 is a bottom view of another prior art shock limiter.

FIG. 4 illustrates a bottom view of an alternative embodiment of a prior art head gimbal assembly 34, having a shock limiter 36 formed from the gimbal 28 and positioned through opening 38 in the load beam 24. As shown, the slider 12 is positioned almost directly over the limiter 36, thereby improving the performance of the limiter 36; however, to produce the limiter from the gimbal 28, material must be removed from the gimbal 28, directly in the bonding area under the slider 12. This material removal necessarily weakens the bond between the gimbal 28 and the slider 12, which may lead the slider 12 to separate from the gimbal 28 during a shock event.

The opening 38 shown in both FIGS. 3 and 4 is formed by removal of material from the load beam 24. In order to provide openings for interleaving the limiter through the load beam 24, the load beam tip 48 must be made larger, thus compromising the resonance performance of the structure.

FIG. 5 illustrates a shock limiter configuration in a head gimbal assembly 42 according to the present invention, which is intended for disc drive applications, including Load/Unload and non-Load/Unload designs. FIG. 5 illustrates a load beam 44 having a static-attitude dimple 46 and a load beam tip 48 with a dimple 50. The gimbal 52 is attached to the load beam 44 via weld points 54. The slider 12 (shown in shadow) is bonded to the gimbal 52. A flex circuit 56 is shown attached to the gimbal 52. Gimbal 52 has a limiter 58 having flange portions 60 and arm portions 62.

As shown, the flange portions 60 of the limiter 58 are bent upward around the load beam tip 48, and the arm portions 62 are bent toward one another over the load beam tip 48. Both bends define angles relative to the planar surface of the gimbal 52. In one embodiment, the angle of each bend approaches 90 degrees, relative to the surface of the gimbal 52. In a preferred embodiment, the angles are approximately 80 degrees. When a shock event occurs, the event can induce stress in the gimbal 52. The arm portions 62 prevent separation of the gimbal 52 from the load beam 44 by insuring that the deflection of the gimbal 52 is not large enough to cause the stress to reach the yield point of the attachment of the gimbal 52 resulting in damage.

FIG. 6 illustrates head/gimbal assembly 42 of FIG. 5 from a bottom plan view. FIG. 6 shows a load beam 44 connected to a gimbal 52 via weld points 54. The location of the dimple 50 is shown (in phantom) on the tongue 64 of the gimbal 52 for clarity, though the dimple 50 would not be visible through the gimbal 52 in actuality. As shown, the limiter 58 has flange portions 60 with an arm portions 62 that are bent around the load beam tip 48 on both sides of the load beam tip 48.

Generally, the length of the flange portions 60 and the arm portions 62 are limited by the width of the gimbal 52. If the load beam 44 has rails extending along its length to reinforce the load beam 44, the length of the arm portions 62 may be limited by the location of the end of the rails relative to the position of the gimbal 52. Specifically, during assembly, the arm portions 62 are bent toward the dimple 50, and there must be sufficient clearance between the arm portions 62 and the end of the rails so the arm portions 62 do not contact the rails during the bending process.

In FIG. 7, the gimbal 52 is shown prior to attachment to the load beam 44. Specifically, the gimbal 52 may be machined, laser processed, etched or otherwise fabricated using any known technique. As shown, the gimbal 52 is flat with the shape of the limiter 58 cut out from the flat substrate of the gimbal 52.

There exists a gap 66 between the arm portions 62 and the tongue 64 of the gimbal 52 on both sides of the limiter 58, after the gimbal 52 is attached to the load beam 44. Typically, gaps 56 have a minimum length of 2.5 mils. These gaps 56 provide a range of adjustability for head-media spacing and for adjusting the attitude of the slider 12 during the assembly process. In other words, the gimbal 52 can be adjusted even after arm portions 62 of the limiter 58 are extended around the load beam tip 48 by shifting the gimbal 52 relative to the load beam tip 48. This adjustability was not available with prior art "snap fit" limiters where the limiter elements snapped through the body of the load beam.

As shown, the limiter 58, including the flange portions 60 and the arm portions 62 are cut out from within the existing profile of the gimbal 52, such that no additional material must be added to the gimbal 52 to provide the limiter 58. Moreover, the footprint of the load beam 44 can be made smaller than the prior art interleaved assemblies because no opening 38 is provided in the substrate of the load beam 44. Since no such openings are required, the load beam tip 48 can be kept narrow without sacrificing attachment surfaces for bonding or welding the gimbal 52 to the load beam 44. In this manner, the flat footprint of the gimbal 52 is minimized without sacrificing performance. More importantly, no change is required to the load beam 40 in order to implement the limiter 58 of the present invention. Since no additional material is added to the load beam 40, resonance performance is maintained. Moreover, since the material is removed from the gimbal 52 symmetrically to provide the limiter 58, the overall assembly 38 experiences negligible change in mass. While a change in mass would effect resonance characteristics of the assembly and lower the performance of the system, the invention can be implemented without adversely effecting performance or resonance.

FIGS. 8a–8c illustrate the limiter 58 with the flange portions 60 and arm portions 62 in various positions. FIG. 8a shows the limiter 58 in a flat position. The limiter 58 has flange portions 60 and arm portions 62, and the location of the dimple 42 is shown for clarity. As shown, each arm portion 62 defines the gap 56. Additionally, the flange fold line 68 and the arm fold line 70 are illustrated as dotted lines.

In FIG. 8b, the limiter 58 is partially bent along the flange fold line 68. As shown from a bottom view, the flange portion 60 extends downward and the arm portion 62 remains in the same plane as the surface of the flange portion 60.

In FIG. 8c, the limiter 58 is shown in the fully assembled position, where the flange portion 60 is bent along the flange fold line 68, and the arm portion 62 is bent along the arm fold line 70. In this fully assembled position, when the limiter 58 is attached to the load beam 44, the arm portions 62 extend around the load beam tip 48 as shown in FIGS. 3 and 4.

The gimbal 52 with the limiter 58 is formed from a unitary piece of substrate material, which may be a printed circuit board, metal, or any other material. The gimbal 52 may be formed from the same or different material from the load beam 44.

Generally, after the gimbal 52 is fabricated with the limiter 58, the gimbal 52 is welded to the load beam 44 at weld points 54. Then, the flange portions 60 and the arm portions 62 are bent around the load beam tip 48 to complete the assembly of the shock limiter 58.

The structure 38 described herein, including the limiter 58, generally requires few if any adjustments to the controller corresponding to mass changes in the system. Additionally, the limiter structure 58 has negligible impact on the tolerances or clearances (assembly or operational) of the disc drive system. Finally, the gaps 66 provided by the arm portions 62 allow for some adjustability of the attitude of the slider 12, limited by the size of the gap 66. This allows for adjustment of the gimbal 52 in line with the dimple 46.

In the present invention, the limiter 58 is located close to the load point and the center of mass of the slider, which increases the frequency response of the system. Additionally, by designing the limiter 58 to be located close to the load point (dimple 50), the limiter 58 is made more effective in limiting damage than prior art shock limiters. Moreover, the gap 66 is designed to maximize adjustability during assembly. Furthermore, the load beam tip 48 can be minimized because no internal load beam 44 features are required, such as slots, forms and the like, in order to implement the limiter 58. Finally, the arrangement of the weld points 54 relative to the limiter 58 allows for more effective control of the gimbal 52 during a shock event, preventing damage.

Additionally, the invention minimizes the loss of the slider bonding area between the slider 12 and the tongue 64. Deflection under acceleration loading in a shock event does not degrade the engagement of the slider 12 and the tongue 64.

By positioning the slider 12 adjacent the shock limiter 58, not only are the structural resonances of the system as a whole improved, but the moment arm caused by the load of the slider 12 on the gimbal 52 is at the center of mass, allowing the shock limiter 58 to function properly. Finally, the limiter 58 introduces little interference with ball bond and SA adjust processes.

Although the present invention has been described with reference to preferred embodiments, workers skilled in the art will recognize that changes may be made in form and detail without departing from the spirit and scope of the invention.

What is claimed is:

1. A suspension assembly comprising a gimbal;
    a load beam having an actuator engagement end and a gimbal engagement end opposite the actuator engagement end, the gimbal engagement end including a tip region having two side edges; and
    a shock limiter formed from the gimbal, the shock limiter having a pair of flange extensions arranged symmetrically relative to a longitudinal axis of the shock limiter, the flange extensions positioned outside of the side edges of the tip region to limit movement of the gimbal relative to the load beam during a shock event.

2. The suspension assembly of claim 1, wherein the shock limiter further comprises:
    an arm extending from each flange extension.

3. The suspension assembly of claim 2, wherein each arm has a width that defines a limiter gap.

4. The suspension assembly of claim 2, wherein each flange extension is bent at an angle of approximately 80 degrees relative to the gimbal and around the gimbal engagement end, and wherein each arm is bent at an angle of approximately 80 degrees relative to each flange extension, such that the arms extend toward one another over a top surface of the load beam adjacent the gimbal engagement end.

5. The suspension assembly of claim 1, wherein each flange extension is positioned adjacent a slider bonding area and adjacent a load point.

6. The suspension assembly of claim 2 wherein the length of the flange and arm extensions do not exceed the width of the gimbal.

7. The suspension assembly of claim 2, wherein the arm extending from each flange extension defines an adjustment gap between atop surface of the load beam at the tip region of the gimbal engagement end and a bottom edge of an arm extension extending from the flange extension.

8. A method of fabricating a shock limiter for use with a suspension assembly, the method comprising:
    etching a gimbal with a limiter from a fiat substrate, the limiter having a pair of flange extensions, each flange extension having an arm extension;
    bending the flange extensions to an angle approaching normal relative to the flat substrate of the gimbal;
    bending the arm extensions toward one another; and
    attaching the gimbal with the limiter to a load arm, the load arm having a gimbal engagement end with edges extending longitudinally along a length of the load arm, such that the flange extensions and the arm extensions are bent around the edges.

9. The method of claim 8, further comprising:
    adjusting a pitch and roll attitude.

10. The method of claim 8, wherein the step of attaching further comprises:
    aligning the gimbal with a dimple on the load arm such that the flange extensions and the arm extensions are in close proximity to a load point.

11. The method of claim 10, further comprising:
    adjusting a pitch and roll attitude of the gimbal within an adjustment range that is maximized by the arm extensions being in close proximity to the load point.

12. The method of claim 8, wherein the flange extension is bent at an angle of approximately 80 degrees relative to the gimbal and the arm extension is bent at angle of approximately 80 degrees relative to the flange extension.

13. The method of claim 8, wherein attaching comprises:
    positioning the gimbal with the limiter adjacent the gimbal engagement end; and
    welding the gimbal to the load arm adjacent the gimbal engagement end.

14. The method of claim 8, wherein the flange extensions and the arm extensions are positioned adjacent a center of mass of a slider attached to the gimbal.

15. The method of claim 8, wherein bending the arm extensions comprises:
    bending the arm extensions toward a dimple of the load arm.

16. A shock limiter for use with system having an actuator arm, a load beam, a gimbal, and a slider, the shock limiter being integrally formed with the gimbal, the shock limiter comprising:
    a pair of flange extensions extending from a body of the gimbal at an angle approaching normal relative to a planar surface of the gimbal on opposing sides of the body in a symmetric arrangement about side edges a tip of a load beam; and
    a pair of arm extensions, each arm extension extending from each flange extension at an angle approaching normal relative to a planar surface of the flange extension such that the pair of arm extensions point toward one another to interleave the arm extensions around the tip of the load beam.

17. The shock limiter of claim 16, wherein the gimbal is attached to the load beam via weld points.

18. The shock limiter of claim 16, wherein the flange extensions are defined within a profile of the gimbal.

19. The shock limiter of claim 16, wherein the arm extensions have a width less than a width of the flange extensions such that the arm extensions define a gap between a top surface of the tip and a bottom edge of the arm extensions to allow for pitch and roll adjustment of the gimbal after installation.

20. The shock limiter of claim 16, wherein the gimbal, the shock limiter, and the suspension arm are formed from the same material.

21. The shock limiter of claim 16 wherein the flange extensions and the arm extensions are positioned adjacent a center of mass of the slider attached to the gimbal.

22. The shock limiter of claim 16, wherein the flange extensions are bent toward the gimbal of the load beam.

23. The shock limiter of claim 16, wherein the flange extension define a gap for adjusting an attitude of the gimbal relative to a surface of a rotating disc.

24. The shock limiter of claim 23, wherein the gap is greater than a thickness of the load beam.

25. The shock limiter of claim 16, wherein the flange extensions are designed to be located at or near a center of mass of a gimbal slider assembly.

26. The shock limiter of claim 16 wherein the flange extensions maximize an area on a tongue of the gimbal for bonding the slider to the gimbal.

27. The shock limiter design of claim 16 wherein placement of the limiter in close proximity to a center line of the load beam enhances resonance performance of a head gimbal assembly.

* * * * *